US009548835B2

(12) United States Patent
Liang et al.

(10) Patent No.: US 9,548,835 B2
(45) Date of Patent: Jan. 17, 2017

(54) METHOD OF SUPPORTING TRANSFER OF OPTICAL NETWORK UNIT BETWEEN PASSIVE OPTICAL NETWORKS

(71) Applicant: Alcatel Lucent, Boulogne-Billancourt (FR)

(72) Inventors: Zheng Liang, Shanghai (CN); Fanxiang Bin, Shanghai (CN)

(73) Assignee: Alcatel Lucent, Boulogne-Billancourt (FR)

(*) Notice: Subject to any disclaimer, the term of this patent is extended or adjusted under 35 U.S.C. 154(b) by 0 days.

(21) Appl. No.: 14/423,198

(22) PCT Filed: Aug. 12, 2013

(86) PCT No.: PCT/IB2013/001839

§ 371 (c)(1),
(2) Date: Feb. 23, 2015

(87) PCT Pub. No.: WO2014/033524

PCT Pub. Date: Mar. 6, 2014

(65) Prior Publication Data

US 2015/0229430 A1 Aug. 13, 2015

(30) Foreign Application Priority Data

Aug. 28, 2012 (CN) .......................... 2012 1 0310972

(51) Int. Cl.
*H04J 14/02* (2006.01)
*H04B 10/27* (2013.01)

(52) U.S. Cl.
CPC ........... *H04J 14/0227* (2013.01); *H04B 10/27* (2013.01); *H04J 14/0242* (2013.01)

(58) Field of Classification Search
None
See application file for complete search history.

(56) References Cited

FOREIGN PATENT DOCUMENTS

| | | | |
|---|---|---|---|
| CN | 101035010 | A | 9/2007 |
| CN | 101467366 | A | 6/2009 |
| CN | 101990134 | A | 3/2011 |
| CN | 102149027 | A | 8/2011 |
| CN | 102368836 | A | 3/2012 |
| JP | 2007325160 | A | 12/2007 |
| JP | 2011135280 | A | 7/2011 |

OTHER PUBLICATIONS

G. Talli, "Hybrid DWDM-TDM Long-Reach PON for Next-Generation Optical Access", Journal of Lightwave Technology, July 2006, 8PGS, vol. 24, No. 7, New York.

(Continued)

*Primary Examiner* — Darren E Wolf

(74) *Attorney, Agent, or Firm* — Harness, Dickey & Pierce, P.L.C.

(57) ABSTRACT

In one embodiment, the method includes sending a first transfer message to a target optical line terminal (OLT) corresponding to the target passive optical network (PON), the first transfer message including first identifier information of the first ONU; and sending a second transfer message to a source OLT corresponding to the source PON, the second transfer message including second identifier information of the first ONU and wavelength information of the target PON.

12 Claims, 6 Drawing Sheets

(56) References Cited

OTHER PUBLICATIONS

Y. Ma, "Demonstration of a 40Gb/s Time and Wavelength Division Multiplexed Passive Optical Network Prototype System", OFC/NFOEC Postdeadline Papers, National Fiber Optic Engineers Conference, IEEE, 2012, 4pgs.
G. Das, "A Hybrid WDM/TDM PON Architecture Using Wavelength Selective Switches", Advanced Networks and Telecommunication Systems (ANTS), 2010 IEEE 4th International Symposium on, IEEE, 4pgs, Belgium.
A. Dixit, "Wavelength switched hybrid TDMA/WDM (TWDM) PON: A flexible next-generation optical access solution", Transparent Optical Networks (ICTON), 2012 14th International Conference on, IEEE, Jul. 2, 2012 (Jul. 2, 2012), 6pgs, Belgium.
International Search Report PCT/ISA/210 for International Application No. PCT/IB2013/001839 dated Nov. 29, 2013.
Chinese Office Action dated Apr. 19, 2016 issued in corresponding Chinese Application No. 201210310972.1.
Chinese Office Action dated Dec. 5, 2016 issued in corresponding Chinese Application No. 201210310972.1.
Chinese Search Report dated Nov. 25, 2016 issued in corresponding Chinese Application No. 2012103109721.1.

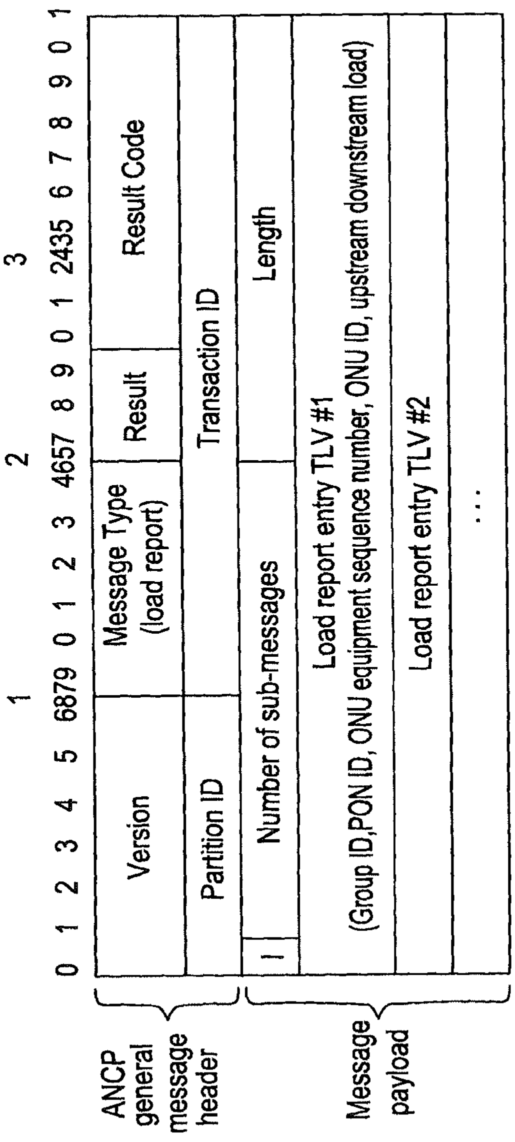

Fig. 7a

ANCP general message header:
- Version | Message Type (load report) | Result | Result Code
- Partition ID | Transaction ID Message payload:
- Number of sub-messages | Length
- Load report entry TLV #1 (Group ID, PON ID, ONU equipment sequence number, ONU ID, upstream downstream load)
- Load report entry TLV #2
- ...

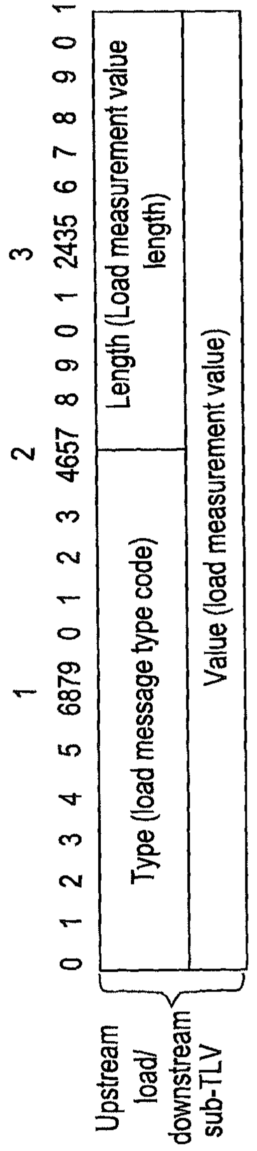

Fig. 7b

Upstream load/downstream sub-TLV:
- Type (load message type code) | Length (Load measurement value length)
- Value (load measurement value)

METHOD OF SUPPORTING TRANSFER OF OPTICAL NETWORK UNIT BETWEEN PASSIVE OPTICAL NETWORKS

FIELD OF THE INVENTION

The present disclosure relates to a Multiple Wavelength (MW) Passive Optical Network (PON) system and particularly to a method of supporting a transfer of an Optical Network Unit (ONU) between a plurality of passive optical networks.

BACKGROUND OF THE INVENTION

Recently, a Time and Wavelength Division Multiplexed-Passive Optical Network (TWDM-PON) has been regarded as a primary solution to the Next Generation-Passive Optical Network (NG-PON2) in the standard meeting hosted by the FSAN. Multiple XG-PONs (10 Gbit PONs or 10G Passive Optical Networks) are stacked into a TWDM-PON system. Besides the ITU-T G.multi working team also proposes Multiple Wavelength-Passive Optical Network (MW-PON), which is a stack of several Time Division Multiplexed-Passive Optical Networks (TDM-PONs) by assigning a different wavelength to each TDM PON in a single Optical Distribution Network (ODN). The TDM-PONs include an E-PON, a G-PON, an XG-PON, etc., all of which will be referred simply to as a PON. Thus the TWDM-PON system can be regarded as an MW-PON system. In the MW-PON system, a plurality of PONs share an ODN through time and wavelength division, and an ONU can tune its own wavelength to be connected to a corresponding PON.

In the MW-PON system, a plurality of PON systems share an ODN so as to lower the cost of network deployment and maintenance. However in the existing MW-PON system, each PON is consisted of an Optical Line Terminal (OLT) and a plurality of ONUs connected therewith, and the connections between the OLT and the ONUs are fixed. Consequently the existing MW-PON system is architecturally inflexible.

SUMMARY OF THE INVENTION

In view of the foregoing technical problem, an object of the invention is to provide a method of supporting a transfer of an ONU between a plurality of PONs so as to improve the flexibility of the MW-PON system.

According to an aspect of the invention, there is provided a method of supporting a transfer of a first optical network unit in a source PON network to a target PON, wherein the source PON and the target PON share an ODN, and the method includes the steps of: D. sending a first transfer message to a target OLT corresponding to the target PON, the first transfer message including first identifier information of the first ONU; and E. sending a second transfer message to a source OLT corresponding to the source PON, the second transfer message including second identifier information of the first ONU and wavelength information of the target PON.

Thus the ONU can be transferred from the source PON where it is located to the target PON to thereby change dynamically the architecture of the optical network and improve the flexibility of the optical network.

Here the first identifier information of the ONU refers to any information capable of at least identifying uniquely the ONU in the same ODN, e.g., an equipment sequence number of the ONU. The second identifier information of the ONU refers to any information capable of at least identifying uniquely the ONU in the PON where it is located, e.g., an identifier of the ONU in the PON where it is located. The first identifier information and the identifier information of the ONU can be the same, e.g., both of them can be the equipment sequence number of the ONU. The wavelength information of the PON refers to any information capable of indicating a wavelength used by the PON. For example, the wavelength information can include an upstream wavelength code and a downstream wavelength code.

Optionally the first ONU to be transferred, the source ONU and the target PON can be firstly selected or determined. This can be achieved in numerous ways. In an example, the first ONU makes a transfer request and specifies the target PON. For example, an ONU requires to be transferred from an original PON to a PON belonging to a current operator due to a replaced operator in the case that the respective PONs belong to the different operators. In another example, firstly the first ONU makes a transfer request, and then a coordinator selects the appropriate target PON. In still another example, the coordinator determines the first ONU, the source ONU and the target PON.

According to a particular embodiment of the invention, before the step D, the method further includes the steps of: B. obtaining load information of respective PONs among a plurality of PONs sharing the ODN; and C. selecting the first ONU, the source PON and the target PON according to the load information of the respective PONs and a predetermined transfer policy.

Here the load information of the PON refers to any information capable of indicating the load of the PON. For example, the load information of the PON can include load information of respective ONUs in the PON, load information of respective G-PON Encapsulation Method (GEM) ports of the PON or load information of respective traffic containers (T-CONT) of the PON. In the case that the load information of the PON is the load information of the respective ONUs of the PON, an OLT of the PON can forward load reports of the respective ONUs directly without additional processing to thereby lower the complexity of the OLT as much as possible.

Moreover various different transfer policies can be adopted. In an example, an ONU in a PON with a larger load can be transferred to a PON with a lower load to thereby facilitate load balancing. In another example, all of ONUs in a PON with a lower load can be transferred to another PON and the PON with a lower load can be powered off to thereby facilitate an improved utilization of bandwidths and energy.

According to a particular embodiment of the invention, the predetermined transfer policy includes: selecting the source PON with a load below a predetermined threshold from the plurality of PONs; selecting the target PON, with a capability to transfer the first ONU to the target PON, from the other PONs among the plurality of PONs than the source PON; and the first ONU being any one of one or more ONUs in the source PON.

Optionally an OLT corresponding to a PON is powered off automatically when there is no ONU in the PON. Additionally or alternatively, the method further includes: instructing an OLT corresponding to a PON to be powered off automatically when there is no ONU in the PON.

According to a particular embodiment of the invention, before the step C, the method further includes the step of: determining at least one group according to a predetermined grouping policy, each group including at least two PONs among the plurality of PONs; and the step C includes selecting the target PON from the group to which the source PON belongs.

Thus the transfer of the ONU can be limited to the PON in the same group.

Moreover various grouping policies can be adopted. In an example, the ODN is shared by a plurality of TWDM-PONs, each TWDM-PON includes a plurality of PONs, and the PONs belonging to the same TWDM-PON constitute a group. In another example, a plurality of PONs in the same TWDM-PON can be grouped into different groups. For example, PONs of the same operator can be grouped into a group in the case that respective PONs in the same TWDM-PON belong to different operators.

According to a particular embodiment of the invention, the load information of the respective PONs is reported by OLT corresponding to the respective PONs. Particularly the step B includes the steps of: receiving load report messages sent from OLTs corresponding to the respective PONs among the plurality of PONs, the respective load report messages including the load information of the corresponding PONs; and determining the load information of the respective PONs from the received respective load report messages.

Optionally the respective PONs can send automatically the load report messages periodically or send the load report messages in response to a request.

According to a particular embodiment of the invention, before the step D, the method further includes the steps of: A1. receiving first registration messages sent from OLTs corresponding to respective PONs among a plurality of PONs sharing the ODN respectively, the respective first registration message including wavelength information of the corresponding PONs; and A2. receiving second registration messages sent from the OLTs corresponding to the respective PONs respectively, the respective second registration messages including third identifier information of respective ONUs among one or more ONUs in the corresponding PONs, and determining the first identifier information and the second identifier information of the respective ONUs from the third identifier information of the respective ONUs.

Here the third identifier information of the ONU refers to any information from which the first identifier information and the second identifier can be derived. In the case that the first identifier information is the equipment sequence number of the ONU and the second identifier information is the identifier of the ONU in the PON where it is located, the third identifier information can be a combination of the equipment sequence number of the ONU and the identifier of the ONU in the PON where it is located. The third identifier information can also be the same as the first identifier information and the second identifier information in the case both of the latter are the same.

Optionally the method further includes: receiving a third registration message sent from the OLT corresponding to the target PON, the third registration information including the third identifier information of the first ONU. The third registration information indicates that the first ONU has been activated in the target PON, that is, the first ONU has been transferred to the target PON. In an example, the third registration message can be the same message as the second registration message.

Alternatively the OLT corresponding to the target PON can send a feedback message only when the first ONU is not transferred successfully to the target PON so that if no feedback information from the OLT corresponding to the target PON is received, then this indicates that the first ONU has been transferred successfully to the target PON.

According to another aspect of the invention, there is provided a method, in a target OLT corresponding to a target PON, of supporting a transfer of a first ONU in a source PON to the target PON, wherein the source PON and the target PON share an ODN, and the method includes the steps of: receiving a first transfer message from a coordinator, the first transfer message including first identifier information of the first ONU; and activating the first ONU in the target PON according to the received first transfer message.

According to another aspect of the invention, there is provided a method, in a source OLT corresponding to a source PON, of supporting a transfer of a first ONU in the source PON to a target PON, wherein the source PON and the target PON share an ODN, and the method includes the steps of: a. receiving a second transfer message from a coordinator, the second transfer message including second identifier information of the first ONU and wavelength information of the target PON; b. sending a transfer instruction to the first ONU, the transfer instruction including second identifier information of the first ONU and the wavelength information of the target PON; and c. deactivating the first ONU in the source PON.

According to another aspect of the invention, there is provided a method, in a first ONU in a source PON, of supporting a transfer of the first ONU to a target PON, wherein the source PON and the target PON share an ODN, and the method includes the steps of: receiving a transfer instruction from an OLT corresponding to the source PON, the transfer instruction including second identifier information of the first ONU and wavelength information of the target PON; and tuning wavelength used by the first ONU according to the wavelength information of the target PON.

According to another aspect of the invention, there is provided a coordinator of supporting a transfer of a first optical network unit in a source PON network to a target PON, wherein the source PON and the target PON share an ODN, and the coordinator includes: a first sending unit configured to send a first transfer message to a target OLT corresponding to the target PON, the first transfer message including first identifier information of the first ONU; and a second sending unit configured to send a second transfer message to a source OLT corresponding to the source PON, the second transfer message including second identifier information of the first ONU and wavelength information of the target PON.

The coordinator can be a logic entity and can be embodied by any one of an MW-PON access node, a Network Access Server (NAS) and a policy server. Alternatively the coordinator can be a separate entity.

BRIEF DESCRIPTION OF DRAWINGS

Other features, objects and advantages of the invention will become more apparent from the following detailed description of non-limiting embodiments with reference to the drawings in which:

FIG. 7 to FIG. 9 illustrate schematic diagrams of a load report message, a first transfer message and a second transfer message respectively according to a particular embodiment of the invention.

Throughout the drawings, identical or like reference numerals denote identical or like step features and/or devices/modules.

DETAILED DESCRIPTION OF EMBODIMENTS

Figure 1:
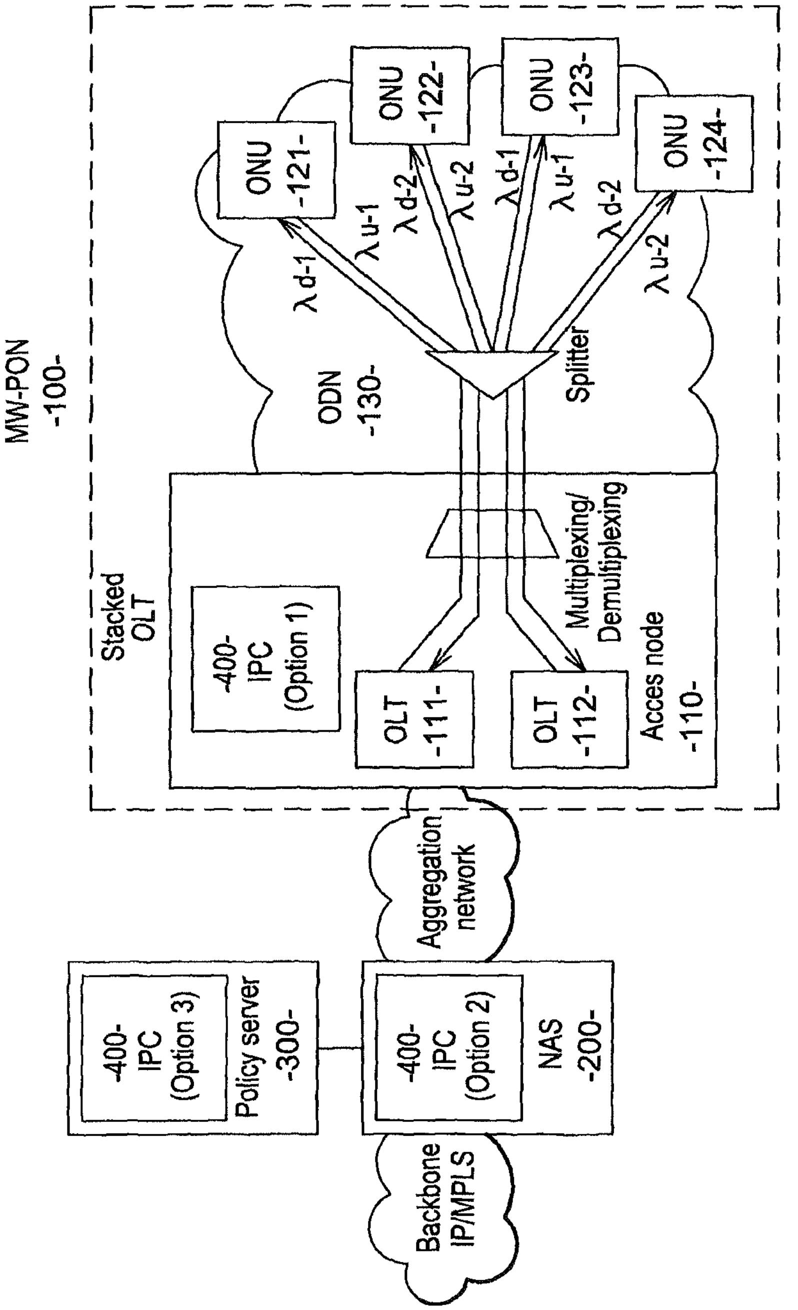
FIG. 1 illustrates a schematic architectural diagram of a typical optical network system including an MW-PON which is an access network, a network access server and a policy server.

FIG. 1 illustrates a schematic architectural diagram of a typical optical network system including an MW-PON 100 which is an access network, a Network Access Server (NAS) 200 and a policy server 300. The network access server 200 is a network element aggregating traffic from a plurality of access nodes. The network access server can be an enforcement point of policy management and IP Quality of Service (QoS) guaranteeing in the access network. The network access server is also referred to as a Broadband Network Gateway (BNG) or a Broadband Remote Access Server (BRAS). Each access node corresponds to an MW-PON. Those skilled in the art can appreciate although only one MW-PON 100 is illustrated in FIG. 1, the network access server 200 can connect a plurality of access nodes and thus a plurality of MW-PONs, the plurality of MW-PONs being capable of sharing the ODN 130. With an MW-PON technology, an access node includes a plurality of stacked OLTs, where each OLT is connected with a plurality of ONUs through the ODN, and each OLT together with the ONUs connected therewith constitutes a PON. As illustrated in FIG. 1, an access node 110 includes an OLT 111 and an OLT 112 which are stacked. The OLT 111 together with an ONU 121 and an ONU 123 constitutes a PON 141. The OLT 112 together with an ONU 122 and an ONU 124 constitutes a PON 142. A downstream wavelength and an upstream wavelength used by the PON 141 are λd-1 and λu-1 respectively. A downstream wavelength and an upstream wavelength used by the PON 142 are λd-2 and λu-2 respectively. Correspondingly the PON 141 and the PON 142 constitute the MW-PON 100. The foregoing contents are known to those skilled in the art and thus only described briefly here.

As described above, the invention proposes a method of and corresponding coordinator for supporting a transfer of a first ONU in a source PON to a target PON. Hereinafter, the coordinator will be referred to as an inter-PON coordinator or simply an IPC. The IPC can be a logic entity. The IPC can be deployed in numerous ways according to the invention. As illustrated in FIG. 1, an IPC 400 can be deployed as follows but not limited thereto:

Option 1: the IPC is embodied on an access node;

Option 2: the IPC is embodied on the NAS; and

Option 3: the IPC is embodied on the policy server.

The IPC can be deployed in an appropriate way as needed in practice. The option 2 will be taken below as an example without loss of generality, but those skilled in the art can appreciate that the option 1 and the option 3 can also be implemented in analogy. Communication between the IPC and respective OLTs is performed below over a link layer (Layer 2) control channel, but those skilled in the art can also appreciate that communication between the IPC and the respective OLTs can alternatively be performed over another appropriate channel.

A particular embodiment of the invention will be described below with reference to FIG. 2 to FIG. 9. The transfer of the first ONU from the source PON to the target PON is triggered by the IPC in this embodiment. Specifically the IPC selects the first ONU to be transferred, the source PON and the target PON according to load information of the respective PONs and a predetermined transfer policy.

Figure 2:
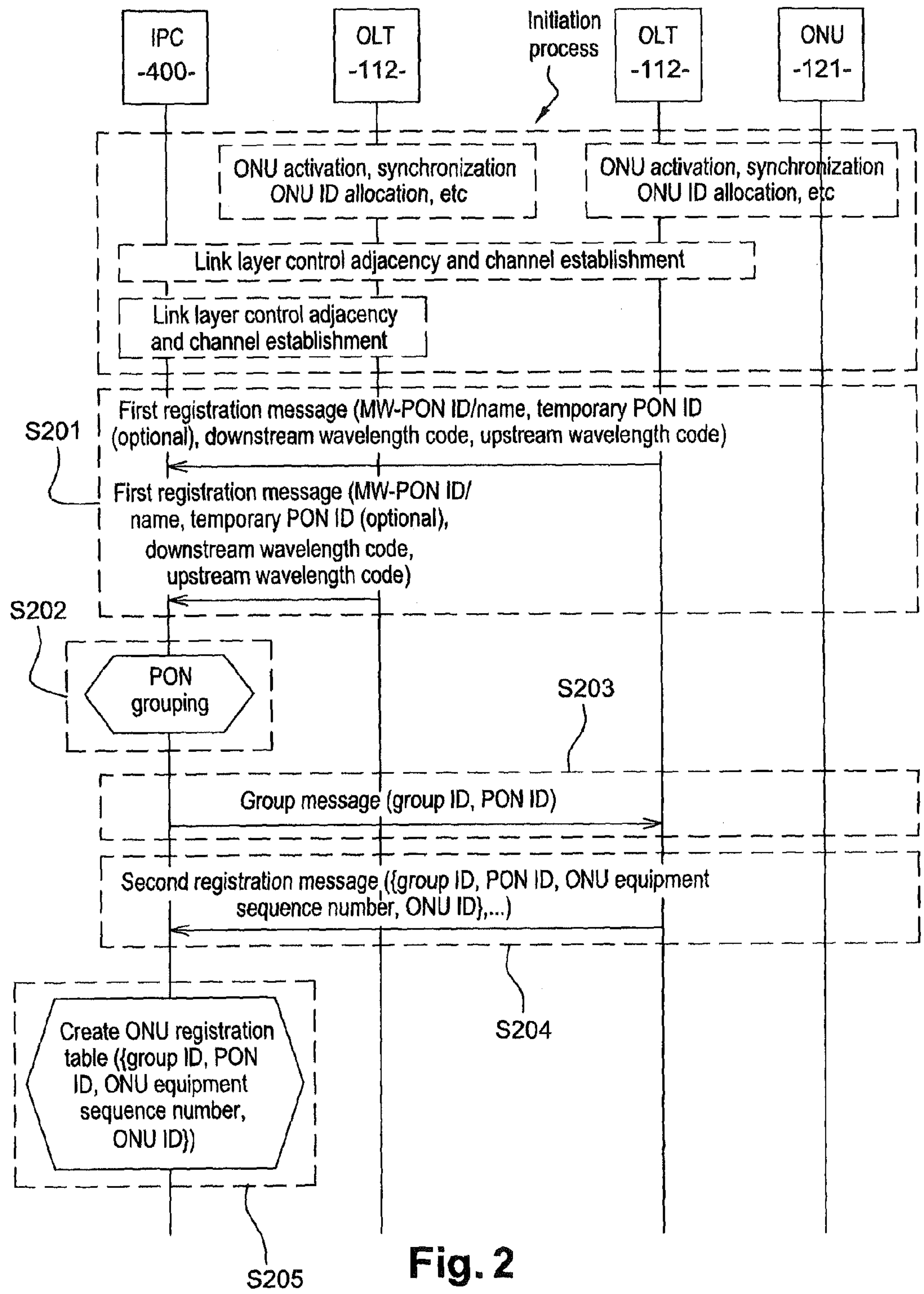
FIG. 2 illustrates a flow chart of a method of registering and grouping a PON according to a particular embodiment of the invention.

FIG. 2 illustrates a flow chart of a method of registering and grouping a PON according to a particular embodiment of the invention.

Firstly, corresponding connections are established between the IPC 400 on the NAS, the OLT 111, the OLT 112 and the corresponding ONUs 121-124 in an initiation process. As illustrated in FIG. 2, the initiation process includes ONU activation, synchronization, ONU ID assignment, and link layer (Layer 2) control adjacency and channel establishment.

Next in the step S201, OLTs corresponding to respective PONs among a plurality of PONs sharing the ODN send first registration messages to the IPC 400, where the respective first registration messages include wavelength information of the corresponding PONs. Specifically the OLT 111 sends a first registration message to the IPC 400 to notify the IPC 400 of information of the PON 141 corresponding thereto. The first registration message includes identifier information of the MW-PON 100 where the OLT 111 is located and wavelength information of the PON 141 corresponding to the OLT 111. The identifier information of the MW-PON 100 is an identifier or a name of the MW-PON (MW-PON_ID/Name), for example. The wavelength information of the PON 141 is a downstream wavelength code (λd-code) and an upstream wavelength code (λu-code) indicating a downstream wavelength λd-1 and an upstream wavelength λu-1 used by the PON 141 respectively. Similarly the OLT 112 also sends a first registration message to the IPC 400. Optionally the first registration message can further include a temporary PON identifier (Temp PON_ID). The temporary PON identifier is allocated by a respective MW-PON for its own PON. Generally the temporary PON identifier is unique only in the MW-PON.

In the step S202, the IPC 400 determines at least one group according to a predetermined grouping policy, where each group includes at least two PONs. In this embodiment, the group policy is such that PONs belonging to the same MW-PON are grouped into a group, so the IPC 400 groups the PON 141 and the PON 142 into the same group. Moreover the IPC 400 further allocates a group identifier (Group_ID) for each group. As described above, the temporary PON identifier is unique only in the MW-PON, and PONs in different MW-PONs may be provided with the same temporary PON identifier. In order to identify uniquely the respective PONs, the IPC 400 further allocates a PON identifier (PON_ID) for each PON.

In the step S230, the IPC 400 sends a grouping response message to the OLT 111, where the grouping response message includes a group identifier and a PON identifier of the PON 141. Similarly the IPC 400 sends a corresponding grouping response message (not illustrated) to the OLT 112.

In the step S204, the OLTs corresponding to the respective PONs send second registration messages to the IPC 400, where the respective second registration messages include third identifier information of respective ONUs among one or more ONUs in the corresponding PONs, and the first identifier information and the second identifier information of the respective ONUs are determined from the third identifier information of the respective ONUs. In this embodiment, the first identifier information is the equipment sequence number of the ONU, the second identifier information is the identifier of the ONU, and the third identifier information includes the equipment sequence number of the ONU and the identifier of the ONU. Specifically the OLT 111 sends a second registration message to the IPC 400 to notify the OPC 400 of information of the respective ONUs in the corresponding PON 141. The second registration message includes a plurality of quadruplets, and each quadruplet corresponds to information of an ONU. Each quadruplet includes the group identifier (Group_ID) of the PON where the ONU is located, the identifier of the PON where the ONU is located (PON_ID), the equipment sequence number of the ONU (ONU_SN) and the identifier of the ONU (ONU_ID). Similarly the OLT 112 also sends a second registration message (not illustrated) to the IPC 400.

In the step S205, the IPC 400 creates an ONU registration table according to the received second registration message, where each entry is the quadruplet of an ONU. In anther embodiment, the IPC 400 can alternatively store the information of the respective ONUs in another appropriate way.

The first registration message, the grouping response message and the second registration message can be embodied in various appropriate ways. For example, these messages can be borne in an Access Node Control Protocol (ANCP) message.

Figure 3:
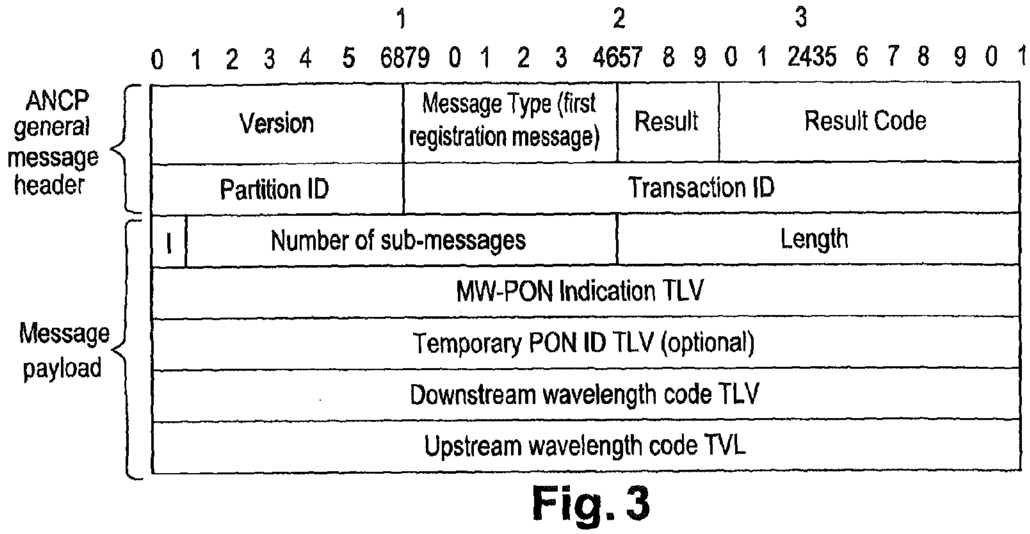
FIG. 3 to FIG. 5 illustrate schematic diagrams of a first registration message, a grouping response message and a second registration message according to a particular embodiment of the invention respectively.
Figure 4:
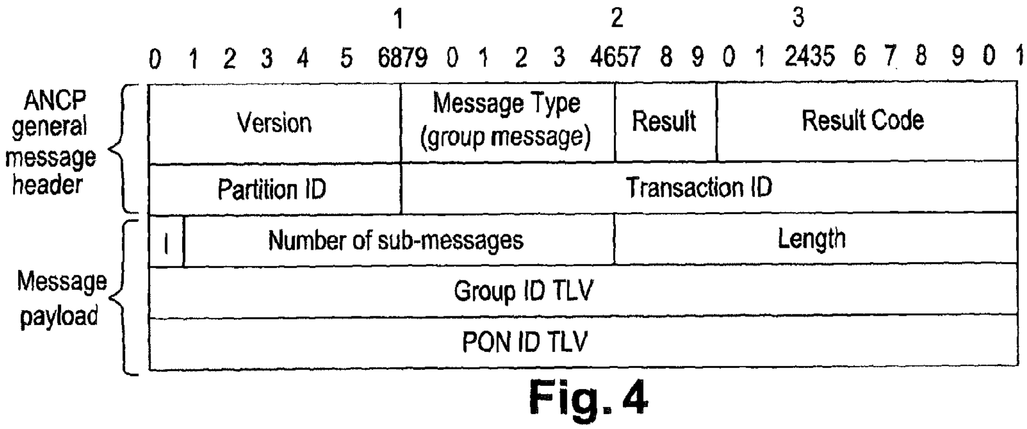
Figure 5:
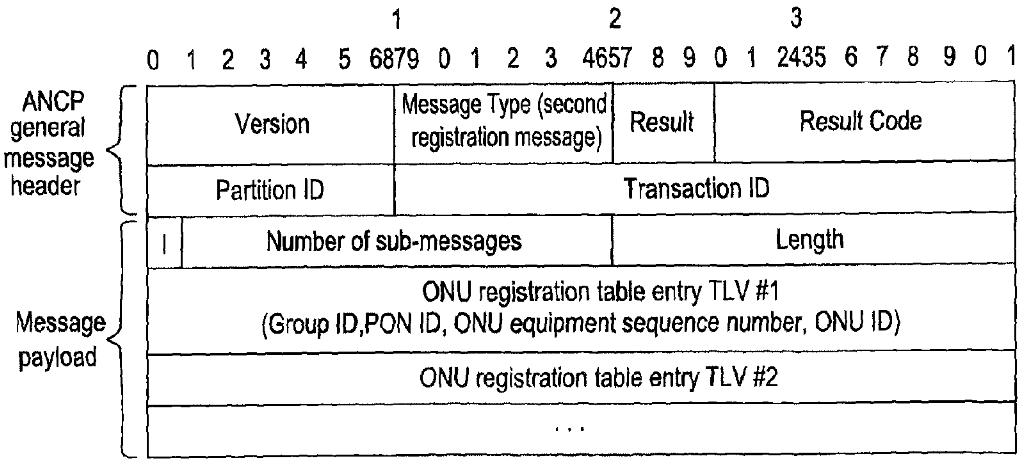

FIG. 3 to FIG. 5 illustrate schematic diagrams of a first registration message, a grouping response message and a second registration message according to a particular embodiment of the invention respectively.

Specifically the first registration message, the grouping response message and the second registration message are embodied in extended ANCP messages. For conciseness of the following description, only the extended part of the ANCP message will be described, and the description of existing fields in the ACNP message will be omitted. The existing fields in the ACNP message include Version, Result, Result Code, Partition ID, Transaction Identifier, SubMessage Number and Length.

Referring to FIG. 3, the first registration message can be embodied in a newly proposed ANCP general message. The ANCP general message includes Message Type and four Type-Length-Value (TLV) fields, one of which is optional. Message Type indicates that the message is a first registration message. The four TLV fields are respectively:

MW-PON Indication (MW-PON) TLV indicating an identifier or a name of the MW-PON;

Temporary PON Identifier (Temp PON_ID) (optional) indicating a temporary PON identifier of the PON;

Downstream Wavelength Code (λd-code) TLV indicating a downstream wavelength used by the PON; and Upstream Wavelength Code (λu-code) TLV indicating an upstream wavelength used by the PON.

Particularly the temporary PON identifier is an optional field, and this field can be omitted when no temporary PON identifier is generated by the OLT corresponding to the PON.

Each TLV field includes three sub-fields, i.e., TLV Type, TLV Length and TLV Value. TLV Type is a 16-bit sub-field indicating the type of data in the TLV Value sub-field. TLV Length is a 16-bit sub-field indicating the length of the data (precluding any padding) in the TLV Value sub-field. If a TLV includes another TLV, then any padding of the included TLV shall be taken into account. The TLV Value sub-field is a length-variable sub-field including the data borne in the TLV.

Referring to FIG. 4, the grouping response message can be embodied in a newly proposed ANCP general message. The ANCP general message includes Message Type and two TLV fields. Message Type indicates that the message is a grouping response message. The two TLV fields are:

Group Identifier (Group_ID) TLV indicating an identifier of a group to which the PON belongs; and PON Identifier (PON_ID) TLV indicating an identifier of the PON.

Referring to FIG. 5, the second registration message can be embodied in a newly proposed ANCP general message. The ANCP general message includes Message Type and one or more ONU registration table entry TLV fields. Message Type indicates that the message is a second registration message. Each ONU registration table entry TLV field indicates information in an entry of the ONU registration table created by the IPC. Each ONU registration table entry TLV field can be a quadruplet including a group identifier (Group_ID), a PON identifier (PON_ID), an ONU equipment sequence number (ONU_SN) an ONU identifier (ONU_ID).

Figure 6:
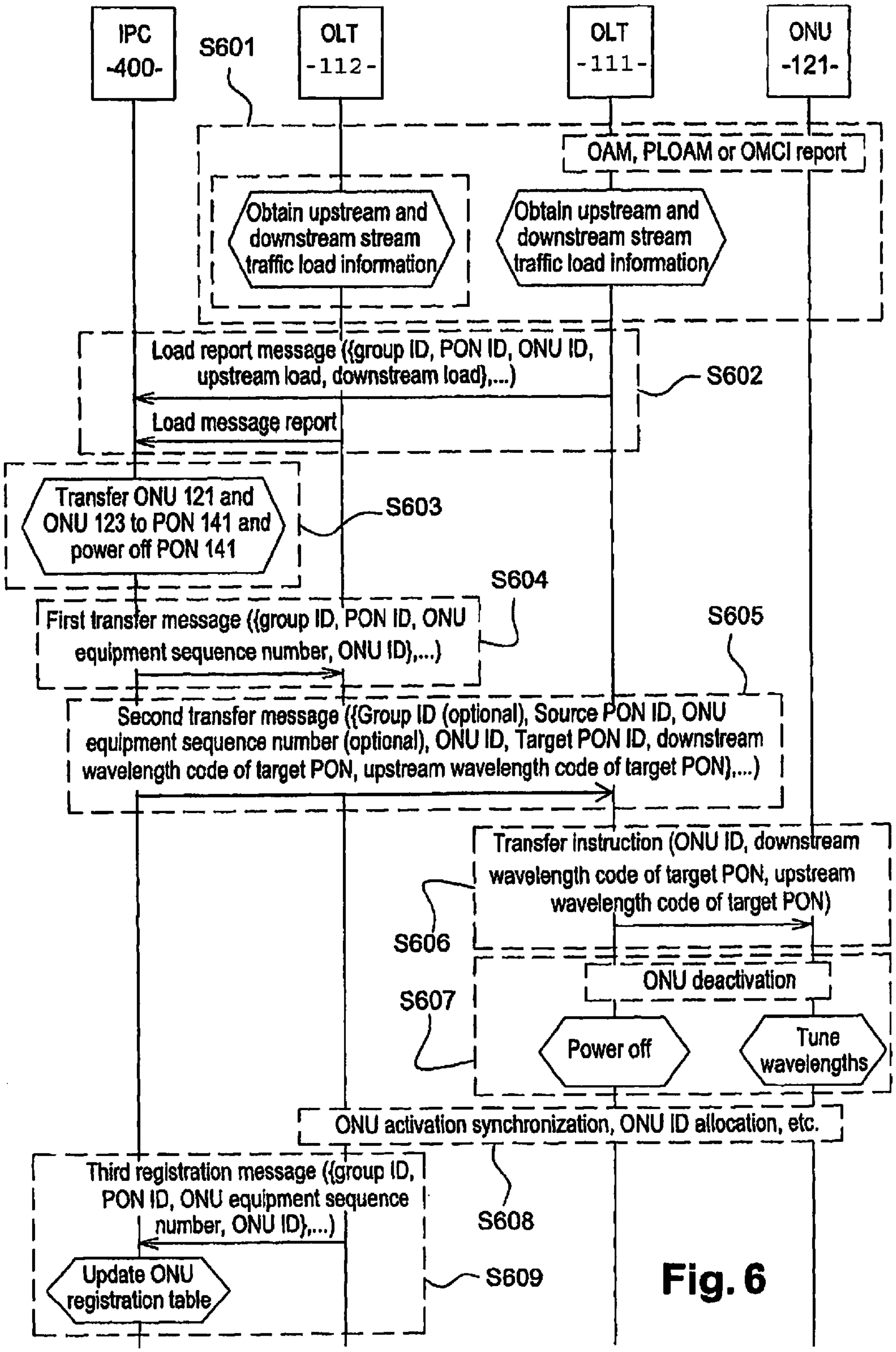
FIG. 6 illustrates a flow chart of a method of transferring a first ONU to a target PON according to a particular embodiment of the invention.

FIG. 6 illustrates a flow chart of a method of transferring a first ONU to a target PON according to a particular embodiment of the invention.

In the step S601, the OLT 111 and the OLT 112 obtain load information of the corresponding PONs (i.e., the PON 141 and the PON 142) respectively. Specifically the load information can include information indicating an upstream traffic load and information indicating a downstream traffic load. For example the OLT can obtain the load information as follows. For the upstream traffic load, the OLT can obtain related information from a Dynamic Bandwidth Report upstream (DBRu) because the DBRu indicates the total amount of data in a logic buffer associated with each allocated identifier (Alloc-ID). For the downstream traffic load, the OLT can obtain related information from the total amount of data sent via each GEM port.

In the step S602, the OLT 111 sends a load report message including one or more entries to the IPC 400. Each entry indicates load information of an ONU in the corresponding PON. Specifically each entry includes a multi-element group including the group identifier of the corresponding PON (i.e., the PON 141), the PON identifier of the corresponding PON, the ONU identifier of the ONU, upstream load information of the ONU and downstream load information of the ONU. The IPC 400 derives load information of the entire PON from the included load information of the respective ONUs in the corresponding PON upon reception of the load message. Similarly the OLT 112 sends a load report message to the IPC 400.

In the step S603, the IPC 400 selects the ONU to be transferred, the source PON and the target PON according to the received load information and a predetermined transfer policy. In this embodiment, the load information of the PON 141 indicates that the PON 141 has a load below a predetermined threshold, so the IPC 400 decides to transfer all of the ONUs (including the ONU 121 and the ONU 123) in the PON 141 to the PON 142 and subsequently powers off the PON 141.

In the step S604, the IPC 400 sends a first transfer message to the OLT 112 corresponding to the target PON 142, where the first transfer message includes the first identifier information of the ONU to be transferred. The first transfer message can further include information of the target PON. In this embodiment, the first transfer message can include one or more multi-element groups. Each multi-element group corresponds to an ONU to be transferred and includes the group identifier of the target PON 142, the PON identifier of the target PON 142, the equipment sequence number of the ONU to be transferred and the ONU identifier of the ONU to be transferred. Specifically the first transfer message here includes two such multi-element groups corresponding respectively to the ONU 121 and the ONU 123. The OLT 112 knows, upon reception of the first transfer message, that the ONU 121 and the ONU 123 will be transferred to the PON 142 corresponding thereto.

In the step S605, the IPC 400 sends a second transfer message to the source PON 141, wherein the second transfer message includes the second identifier information of the ONU to be transferred and wavelength information of the target PON 142. In this embodiment, the second transfer message can include one or more multi-element groups. Each multi-element group corresponds to an ONU to be transferred and includes the ONU identifier of the ONU to be transferred, the PON identifier of the target PON 142, and a downstream wavelength code and an upstream wavelength code of the target PON 142. Optionally each multi-element group can further include the group identifier of the source PON 141, the PON identifier of the source PON 141 and the equipment sequence number of the ONU to be transferred. Here the equipment sequence number of the ONU is unnecessary because the ONU identifier of the ONU can identify uniquely the ONU in the PON where it is located, i.e., the PON 141. Specifically the second transfer message here includes two such multi-element groups corresponding respectively to the ONU 121 and the ONU 123. The OLT knows, upon reception of the second transfer message, that the ONU 121 and the ONU 123 will be transferred to the target PON 142 and the PON 142 uses wavelengths indicated by the downstream wavelength code and the upstream wavelength code.

In the step S606, the OLT 111 sends a transfer instruction to the ONU to be transferred, where the transfer instruction includes the second identifier information of the ONU to be transferred and the wavelength information of the target PON 142. Specifically the OLT 111 sends a transfer instruction to the ONU 121, where the transfer instruction includes the ONU identifier of the ONU 121, and the downstream wavelength code and the upstream wavelength code of the target PON 142. Similarly the OLT 111 sends a corresponding transfer instruction (not illustrated) to the ONU 123. In another embodiment, the OLT 111 can broadcast a transfer instruction in the corresponding PON, and the transfer instruction instructs a plurality of ONUs to be transferred.

The ONU 121 knows the downstream wavelength and the upstream wavelength of the target PON 142, indicated respectively by the downstream wavelength code and the upstream wavelength code in the transfer instruction, upon reception of the corresponding transfer instruction. In the step S607, after the ONU 121 receives the transfer instruction, an ONU deactivation process is performed between the OLT 111 and the ONU 121 to deactivate the ONU 121 in the PON 141. Subsequently the ONU 121 tunes transmission and reception wavelength respectively to the downstream wavelength and the upstream wavelength of the PON 142. Similarly after the ONU 123 receives the transfer instruction, an ONU deactivation process is performed between the OLT 111 and the ONU 123 to deactivate the ONU 123 in the PON 141, and the ONU 123 also tunes transmission and reception wavelength respectively to the downstream wavelength and the upstream wavelength of the PON 142. The OLT 111 will be powered off after all of the ONUs (including the ONU 121 and the ONU 123) in the source PON 141 are deactivated.

In the step S608, ONU activation, synchronization and ONU identifier allocation processes are performed between the OLT 112 and the ONU 121, and these processes are known in the prior art, so a repeated description thereof will be omitted here. Similarly ONU activation, synchronization and ONU identifier allocation processes (not illustrated) are further performed between the OLT 112 and the ONU 123. With the ONU identifier allocation process, the ONU 121 and the ONU 123 obtain new ONU identifiers respectively. So far the ONU 121 and the ONU 123 have been transferred successfully to the PON 142 corresponding to the OLT 112.

In the step S609, the OLT 112 sends a third registration message to the IPC 400, where the third registration message includes the third identifier information of the transferred ONU. In this embodiment, the third registration message is the same type of message as the second registration message and includes a plurality of quadruplets. Each quadruplet corresponds to an ONU and each quadruplet includes the group identifier (Group_ID) of the PON where the ONU is located, the identifier of the PON where the ONU is located (PON_ID), the equipment sequence number of the ONU (ONU_SN) and the identifier of the ONU (ONU_ID). Of course the identifier of the ONU here is a new ONU identifier allocated by the target OLT. The IP 400 updates the ONU registration table with the included quadruplets upon reception of the third registration message.

The load report message, the first transfer message and the second transfer message can be embodied in various appropriate ways. For examples, these messages can be borne in ANCP messages.

Figure 8:
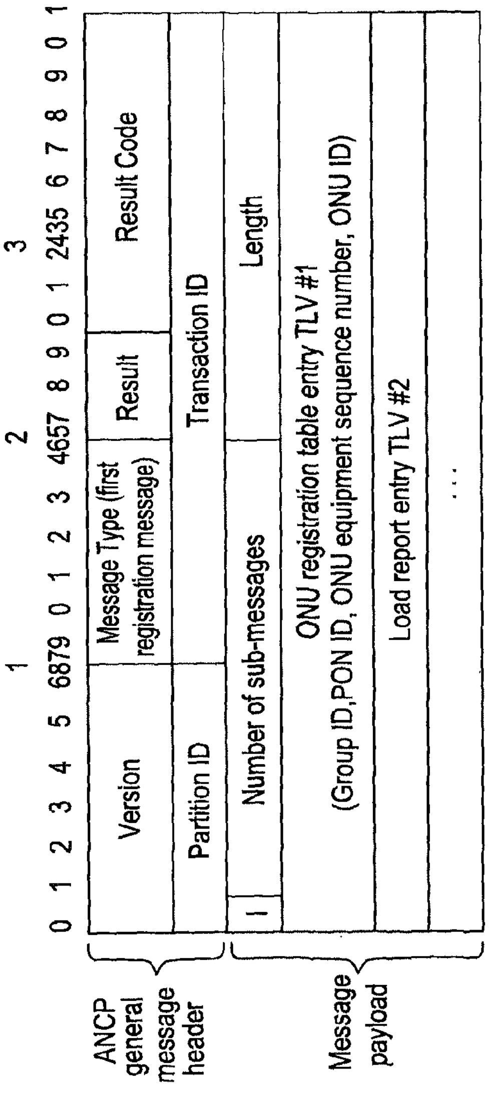
Figure 9:
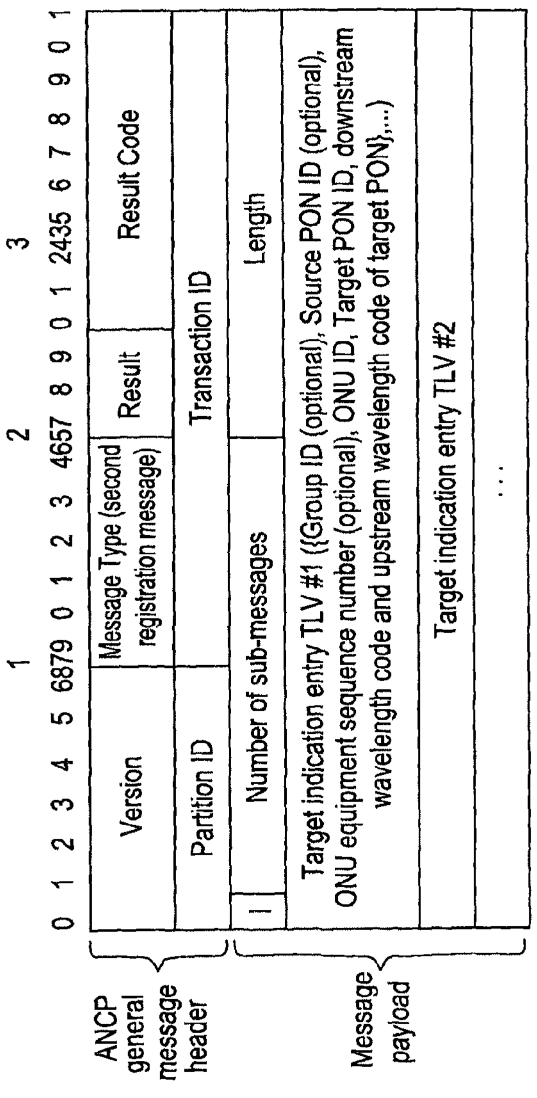

FIG. 7 to FIG. 9 illustrate schematic diagrams of a load report message, a first transfer message and a second transfer message respectively according to a particular embodiment of the invention. Specifically the load report message, the first transfer message and the second transfer message are embodied in extended ANCP messages.

Referring to FIG. 7*a*, the load report message can be embodied in a newly proposed ANCP general message. The ANCP general message includes Message Type and one or more load report entry TLVs, and each entry TLV indicates the load of an ONU. Each entry includes a group identifier (Group_ID), a PON identifier (PON_ID), an ONU equipment sequence number (ONU_SN), an ONU identifier (ONU_ID), an upstream load (US_LOAD) and a downstream load (DS_LOAD). Furthermore the upstream load and the downstream load are sub-TLVs in the load report entry TLV as illustrated in FIG. 7*b*. The upstream load and the downstream load are distinguished by Type Code. Table 1 depicts an example of Type Code.

TABLE 1

Type code for indicating upstream load and downstream load

| Type Code | Description |
|---|---|
| 0x0001 | Upstream load: DBRu report per allocated identifier (Alloc-ID) |
| 0x0002 | Downstream load: Amount of data per GEM port identifier (GEM Port_ID) |
| 0x0003 | Upstream load: DBRu report per ONU identifier (ONU-ID) |
| 0x0004 | Downstream load: Amount of data per ONU identifier (ONU-ID) |
| 0x0005 | Upstream load: Amount of data per allocated identifier (Alloc-ID) |
| 0x0007 | Upstream load: Amount of data per ONU identifier (ONU-ID) |
| . . . | . . . |

Referring to FIG. 8, the first transfer message can be embodied in a newly proposed ANCP general message. The ANCP general message includes Message Type and one or more ONU registration table entry TLV fields. Message Type indicates that the message is a first transfer message to notify the target PON of which ONUs will be transferred. Each ONU registration table entry TLV field corresponds to information in an entry of the ONU registration table created by the IPC 400. Here the ONU registration table entry TLV serves as identifier information of the ONU. When the first transfer message includes a plurality of ONU registration table entry TLVs, this indicates that there are a plurality of ONUs to be transferred to the target PON.

Referring to FIG. 9, the second transfer message can be embodied in a newly proposed ANCP general message. The ANCP general message includes Message Type and one or more target indication entry TLVs. Message Type indicates that the message is a second transfer message to notify the source PON and thus the ONU to be transferred of the PON identifier of the target PON and wavelength information of the target PON. Each target indication entry includes the ONU identifier of the ONU to be transferred, the PON identifier of the target PON, the downstream wavelength code of the target PON 142 and the upstream wavelength code of the target PON 142. Optionally each target indication entry can further include the group identifier of the source PON, the PON identifier of the source PON, the equipment sequence number of the ONU to be transferred, etc.

Moreover the transfer instruction can be embodied in a newly proposed Physical Layer Operation, Administration and Maintenance (PLOAM) message according to a particular embodiment. Table 2 and Table 3 depict definitions of transfer instructions suitable for a G-PON system (ITU G984.3) and an XG-PON system (ITU G987.3) respectively.

TABLE 2

Definition of transfer instruction suitable for G-PON system

| Byte | Content | Description |
|---|---|---|
| 1 | ONU identifier (ONU_ID) | Identifier of ONU to be transferred |
| 2 | Message identifier (Message ID) | Indicate the message to be transfer instruction |
| 3-4 | Downstream wavelength code (λd_code) | Indicate downstream wavelength of target PON |
| 5-6 | Upstream wavelength code (λu_code) | Indicate upstream wavelength of target PON |
| 7-12 | Reserved | |
| 13 | CRC | Cyclic Redundancy Check |

TABLE 3

Definition of transfer instruction suitable for XG-PON system

| Byte | Content | Description |
|---|---|---|
| 1-2 | ONU identifier (ONU_ID) | Identifier of ONU to be transferred |
| 3 | 0x13 | Indicate the message to be transfer instruction |
| 4 | Sequence number (SeqNum) | Unicast or broadcast PLOAM sequence number if applicable |
| 5-6 | Downstream wavelength code (λd_code) | Indicate downstream wavelength of target PON |
| 7-8 | Upstream wavelength code (λu_code) | Indicate upstream wavelength of target PON |
| 9-40 | Reserved | |
| 41-48 | MIC | Message Integrity Check |

Those skilled in the art shall appreciate that all of the foregoing embodiments are merely illustrative but not limiting. Different technical features appearing in different embodiments can be combined to advantage. Those skilled in the art shall appreciate and make other variant embodiments to the disclosed embodiments upon review of the drawings, the description and the claims. In the claims, the term "comprising" will not preclude another device(s) or step(s); the definite article "a" or "an" will not preclude plural; and the terms "first", "second", etc., are merely intended to designate a name but not to suggest any specific order. Any reference numerals in the claims shall not be construed as limiting the scope of the invention. The mere fact that some technical features appear in different dependent claims will not mean that these technical features can not be combined to advantage.

The invention claimed is:

1. A method of supporting a transfer of a first optical network unit in a source passive optical network to a target passive optical network, wherein the source passive optical network and the target passive optical network share an optical distribution network, and the method comprises the steps of:

obtaining, from a plurality of optical line terminals, load information of respective passive optical networks among a plurality of passive optical networks sharing the optical distribution network wherein, each optical line terminal obtains load information of one or more optical network units of a respective passive optical network, of the passive optical networks;

selecting the first optical network unit, the source passive optical network and the target passive optical network according to the load information of the respective passive optical networks and a predetermined transfer policy;

sending a first transfer message to a target optical line terminal corresponding to the target passive optical network, the first transfer message including first identifier information of the first optical network unit;

sending a second transfer message to a source optical line terminal corresponding to the source passive optical network, the second transfer message including second identifier information of the first optical network unit and wavelength information of the target passive optical network, such that, the source optical line terminal sends transfer instructions to the first optical network unit, a deactivation process is performed between the first optical network unit and the source optical line terminal, and an activation and synchronization process is performed between the first optical network unit and the target optical line terminal; and receiving a registration message from the target optical line terminal, based on the performance of the activation and synchronization process.

2. The method according to claim 1, wherein the predetermined transfer policy includes, selecting the source passive optical network with a load below a predetermined threshold from the plurality of passive optical networks;

selecting the target passive optical network, with a capability to transfer the first optical network unit to the target passive optical network, from the other passive optical networks among the plurality of passive optical networks than the source passive optical network; and the first optical network unit being any one of one or more optical network units in the source passive optical network.

3. The method according to claim 1, wherein, the method further includes, prior to the selecting the first optical network, the source passive optical network, and the target passive optical network, performing the step of determining at least one group according to a predetermined grouping policy, each group including at least two passive optical networks among the plurality of passive optical networks; and the selecting the first optical network, the source passive optical network, and the target passive optical network includes selecting the target passive optical network from the group to which the source passive optical network belongs.

4. The method according to claim 1, wherein the obtaining load information includes, receiving load report messages sent from optical line terminals corresponding to the respective passive optical networks among the plurality of passive optical networks, the respective load report messages including the load information of the corresponding passive optical networks; and determining the load information of the respective passive optical networks from the received respective load report messages.

5. The method according to claim 4, wherein the load information includes any one of, load information of respective optical network units in the corresponding passive optical network;

load information of respective GEM ports of the corresponding passive optical network; and load information of respective traffic containers of the corresponding passive optical network.

6. The method according to claim 1, wherein before the sending a first transfer message, the method further includes, receiving first registration messages sent from optical line terminals corresponding to respective passive optical networks among a plurality of passive optical networks sharing the optical distribution network respectively, the respective first registration message including wavelength information of the corresponding passive optical networks; and receiving second registration messages sent from the optical line terminals corresponding to the respective passive optical networks respectively, the respective second registration messages including third identifier information of respective optical network units among one or more optical network units in the corresponding passive optical networks, and determining the first identifier information and the second identifier information of the respective optical network units from the third identifier information of the respective optical network units.

7. A method, in a target optical line terminal corresponding to a target passive optical network, of supporting a transfer of a first optical network unit in a source passive optical network to the target passive optical network, wherein the source passive optical network and the target passive optical network share an optical distribution network, and the method comprises the steps of:

obtaining load information of the target passive optical network, the load information including load information of one or more optical network units of the target passive optical network;

sending a load report message to a coordinator, the load report message including the load information of the target passive optical network, such that the coordinator, selects the first optical network unit, the source passive optical network and the target passive optical network according to at least the load information of the target passive optical network, load information of the source passive optical network, and predetermined transfer policy, the load information of the source passive optical network being received at the coordinator from a source optical line terminal of the source passive optical network, transmits a first transfer message to the target optical line terminal, the first transfer message including first identifier information of the first optical network unit, the first identifier information indicating that the first optical network unit from the source passive optical network is to be transferred to the target optical line terminal based on the load information and a predetermined transfer policy, and transmits a second transfer message to the source optical line terminal, the second transfer message including second identifier information of the first optical network unit and wavelength information of the target passive optical network;

receiving the first transfer message from the coordinator; and subsequent to a deactivation process being performed between the first optical network unit and the source optical line terminal, the deactivation process being performed according to the second transfer message transmitted from the coordinator to the source optical line terminal, activating the first optical network unit in the target passive optical network according to the received first transfer message and sending a registration message to the coordinator.

8. The method according to claim 7, wherein the method further comprises the steps of:

sending a first registration message to the coordinator, the first registration message including wavelength information of the target passive optical network; and sending a second registration message to the coordinator, the second registration message including third identifier information of respective optical network units among one or more optical network units in the target passive optical network.

9. A method, in a source optical line terminal corresponding to a source passive optical network, of supporting a transfer of a first optical network unit in the source passive optical network to a target passive optical network, wherein the source passive optical network and the target passive optical network share an optical distribution network, and the method comprises the steps of:

obtaining load information of the source passive optical network, the load information including load information of one or more optical network units of the source passive optical network;

sending a load report message to a coordinator, the load report message including the load information of the source passive optical network, such that the coordinator, selects the first optical network unit, the source passive optical network and the target passive optical network according to at least the load information of the source passive optical network, load information of the target passive optical network, and a predetermined transfer policy, the load information of the target passive optical network being received at the coordinator from a target optical line terminal of the target passive optical network, transmits a first transfer message to the target optical line terminal, the first transfer message including first identifier information of the first optical network unit, the first identifier information indicating that the first optical network unit from the source passive optical network is to be transferred to the target optical line terminal based on the load information and a predetermined transfer policy, and transmits a second transfer message to the source optical line terminal, the second transfer message including second identifier information of the first optical network unit and wavelength information of the target passive optical network, receiving the second transfer message from the coordinator;

sending a transfer instruction to the first optical network unit, the transfer instruction including second identifier information of the first optical network unit and the wavelength information of the target passive optical network; and deactivating the first optical network unit in the source passive optical network, such that the target optical line network activates the first optical network unit in the target passive optical network according to the first transfer message.

10. The method according to claim 9, wherein the source passive optical network is powered off when there is no active optical network unit in the source passive optical network.

11. The method according to claim 9, wherein the method further comprises the steps of:

sending a first registration message to the coordinator, the first registration message including wavelength information of the source passive optical network; and sending a second registration message to the coordinator, the second registration message including third identifier information of respective optical network units among one or more optical network units in the source passive optical network.

12. A method, in a first optical network unit in a source passive optical network, of supporting a transfer of the first optical network unit to a target passive optical network, wherein the source passive optical network and the target passive optical network share an optical distribution network, and the method comprises the steps of:

sending and receiving traffic upstream and downstream to generate load information of the source passive optical network;

receiving a transfer instruction from a source optical line terminal corresponding to the source passive optical network, the transfer instruction including second identifier information of the first optical network unit and wavelength information of the target passive optical network, the transfer instruction being received based on, the source optical line terminal obtaining the load information of the source passive optical network, a target optical line terminal corresponding to the target passive optical network obtaining load information of the target passive optical network, and the source optical line terminal and the target optical line terminal sending load report messages to a coordinator, the load report messages including the load information of the source passive optical network and the target passive optical network, respectively, such that the coordinator, selects the first optical network unit, the source passive optical network and the target passive optical network according to at least the load information of the source passive optical network, the load information of the target passive optical network, and a predetermined transfer policy, transmits a first transfer message to the target optical line terminal, the first transfer message including first identifier information of the first optical network unit, the first identifier information indicating that the first optical network unit from the source passive optical network is to be transferred to the target optical line terminal based on the load information and a predetermined transfer policy, and transmits a second transfer message to the source optical line terminal, the second transfer message including the second identifier information of the first optical network unit and the wavelength information of the target passive optical network;

performing a deactivation process between the first optical network unit and the source optical line terminal to deactivate the first optical network unit from the source passive optical network, according to the transfer instruction; and tuning transmission and reception wavelengths used by the first optical network unit according to the wavelength information of the target passive optical network, such that the first optical network unit is activated in the target passive optical network.

* * * * *